(12) United States Patent
Quinn et al.

(10) Patent No.: US 7,753,258 B1
(45) Date of Patent: Jul. 13, 2010

(54) METHOD AND APPARATUS FOR COMPLETING A FINANCIAL FORM

(75) Inventors: Chris Quinn, San Diego, CA (US);
Anthony Creed, San Diego, CA (US);
Elizabeth Nelson, San Diego, CA (US);
Shuang Li, San Diego, CA (US); David Bernat, San Diego, CA (US); Greg Miller, San Diego, CA (US); Joseph Elwell, San Diego, CA (US); Jennifer Keenan, San Diego, CA (US); Sue Tritt, San Diego, CA (US); Joel Kopelioff, San Diego, CA (US); Qwan T. Pham, San Diego, CA (US); Jason Char, San Diego, CA (US); Rodney Sitton, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1139 days.

(21) Appl. No.: 11/396,034

(22) Filed: Mar. 31, 2006

(51) Int. Cl.
*G07F 19/00* (2006.01)

(52) U.S. Cl. .................. 235/379; 235/380; 235/375
(58) Field of Classification Search ............... 235/379, 235/487, 380, 375
See application file for complete search history.

(56) References Cited

U.S. PATENT DOCUMENTS

2005/0055290 A1\* 3/2005 Bross et al. .................. 705/31

\* cited by examiner

*Primary Examiner*—Karl D. Frech
(74) *Attorney, Agent, or Firm*—Osha • Liang LLP (57) ABSTRACT

A system and method for completing a financial form including generating a navigation path by selecting a plurality of financial events, where the navigation path is used as a framework to complete the financial form, selecting a webinar event from the plurality of financial events in the navigation path, where the webinar event is one of the plurality of financial events associated with at least one webinar related to one of the plurality of financial events, and completing at least a portion of the financial form using the at least one webinar.

30 Claims, 6 Drawing Sheets

METHOD AND APPARATUS FOR COMPLETING A FINANCIAL FORM

BACKGROUND

Organizations of all types (e.g., corporations, non-profit groups, academic institutions, government bodies, households, individuals, trusts, estates, etc.) are required to complete financial forms. In some cases, it may only be necessary to complete these financial forms once during the life of the organization (e.g., incorporation forms, merger forms, employment application, etc.). In other cases, it may be necessary to complete these financial forms on a frequent basis (e.g., annual tax return, compliance forms, expense reports, etc.).

Financial forms are often used to report financial events to a financial body (e.g., a tax authority). A financial event is any activity that involves a financial transaction or that has a financial impact. Financial events may include, for example, earning wages through full and/or part time employment; trading stocks, bonds, mutual funds, commodities, currencies, and/or bullion; receiving royalties from intellectual property; mortgage payments; medical bills; student loan payments; getting married; having dependents; saving for retirement; paying insurance premiums; business expenses; making charitable donations; automobile payments; etc.

In some cases, a financial form may be used to report only a single financial event. In other cases, a financial form may be used to report multiple financial events. Financial forms may be any number of pages long and may be divided into multiple sections, with each section pertaining to one or more financial events. In many cases, financial forms may also be used to determine additional payments and/or credits that result from the reported financial events (e.g., tax bill, tax refund, etc.).

SUMMARY

In general, in one aspect, the invention relates to a method for completing a financial form including generating a navigation path by selecting a plurality of financial events, where the navigation path is used as a framework to complete the financial form; selecting a webinar event from the plurality of financial events in the navigation path, where the webinar event is one of the plurality of financial events associated with at least one webinar related to one of the plurality of financial events; and completing at least a portion of the financial form using the at least one webinar.

In general, in one aspect, the invention relates to a system for completing a financial form using a plurality of financial events, including: a webinar engine including at least one webinar, where the at least one webinar explains at least one of the plurality of financial events; a navigation path engine for generating a navigation path including a webinar event from the plurality of financial events, where the navigation path is used as a framework to complete the financial form; and a management engine configured to complete at least a portion of the financial form by providing an interface to use a webinar from the plurality of webinars, wherein the webinar is associated with the webinar event in the navigation path.

In general, in one aspect, the invention relates to a computer readable medium containing instructions for completing a financial form, the instructions including functionality to: generate a navigation path by selecting a plurality of financial events, where the navigation path is used as a framework to complete the financial form; select a webinar event from the plurality of financial events in the navigation path, where the webinar event is one of the plurality of financial events associated with at least one webinar related to the one of the plurality of financial events; and complete at least a portion of the financial form using the at least one webinar.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to complete a financial form. Specifically, embodiments of the invention provide a method and apparatus to complete a financial form by generating a navigation path of financial events and using a webinar associated with each of the financial events to complete the financial form.

Figure 1:
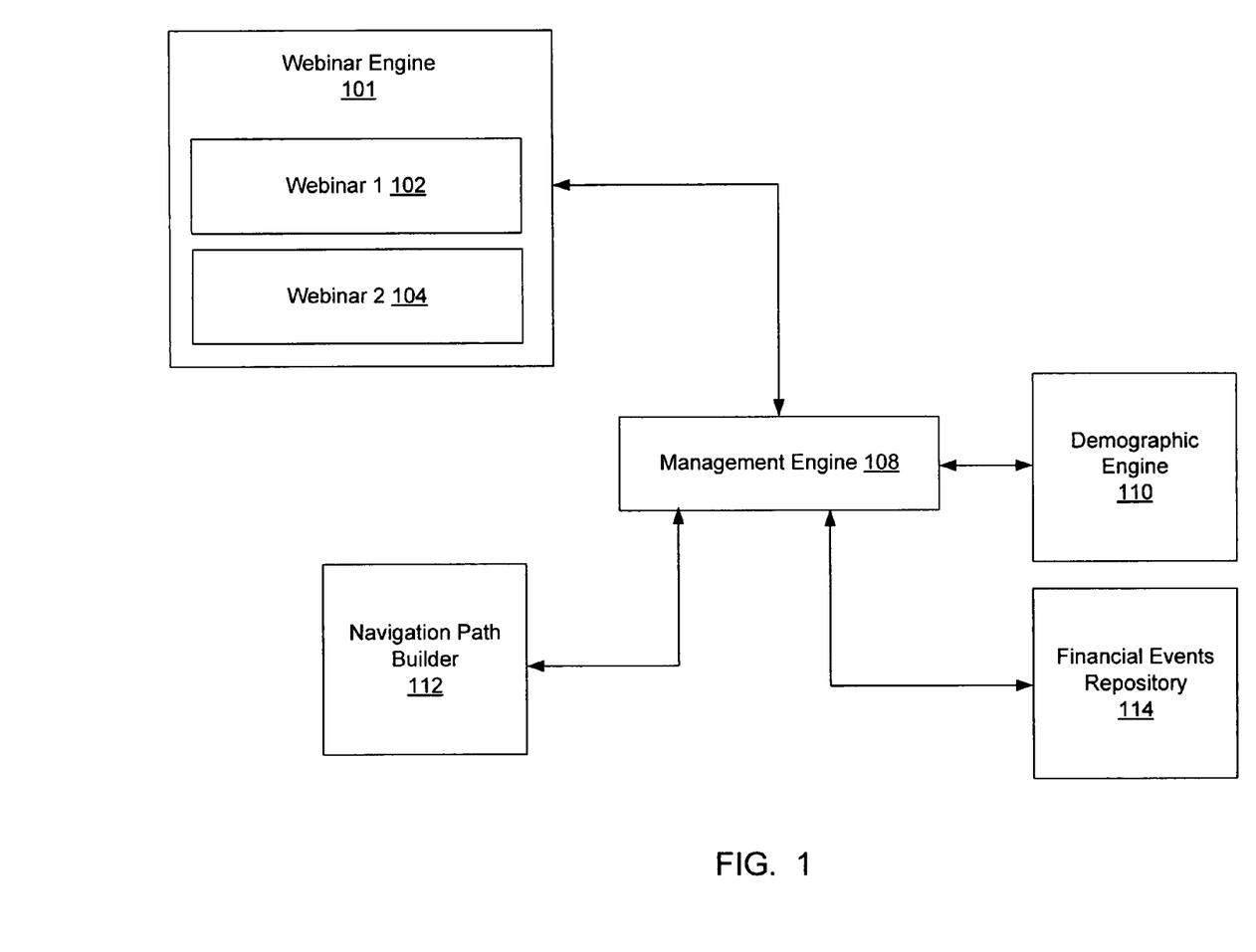
FIG. 1 shows a schematic diagram of a system in accordance with one or more embodiments of the invention.

FIG. 1 shows a system in accordance with one or more embodiments of the invention. As shown in FIG. 1, the system includes numerous components, such as a management engine (Management Engine (108)), a demographic engine (Demographic Engine (110)), a financial events repository (Financial Events Repository (114)), a navigation path builder (Navigation Path Builder (112)), and a webinar engine (Webinar Engine (101)). Each of these components are described below and may be located on the same device (e.g., a server, mainframe, desktop PC, laptop, PDA, television, cable box, satellite box, kiosk, telephone, mobile phone, etc.) or may be located on separate devices connected by a network (e.g., the Internet), with wire and/or wireless segments.

In one or more embodiments of the invention, Financial Events Repository (114) stores financial events that may be reported by one or more financial forms. As discussed above, a financial event is any activity that involves a financial transaction or that has a financial impact. Examples of financial events include, for example, earning wages through full and/ or part time employment; trading stocks; receiving royalties; mortgage payments; getting married; having dependents, etc. Financial Events Repository (114) may be a relational database, a flat file, or any other datastore well known in the art. New financial events may be added to Financial Events Repository (114), while existing financial events may also be modified or deleted.

In one or more embodiments of the invention, Webinar Engine (101) stores at least one webinar (Webinar 1 (102), Webinar 2 (104)) for one or more financial events stored in Financial Events Repository (114). A webinar is associated with a financial event and may be used to complete one or more sections of a financial form that report the financial event. A webinar event may be considered a financial event associated with at least one webinar. Those skilled in the art will appreciate that in one or more embodiments of the invention, Webinar Engine (101) may actually function as a separate entity used to complete an entire financial form reporting one or more financial events.

Consider the following example, which in no way is intended to limit the invention. A mortgage payment is an example of a financial event. An income tax form is an example financial form used to report mortgage payments (or, at least, the interest paid as part of the mortgage payment). A webinar associated with mortgage payments would be used as an interactive, web-based seminar to complete the one or more sections of the income tax form pertaining to mortgages in accordance with one or more embodiments of the invention. In one or more embodiments of the invention, each webinar may also be associated with the user's mood (discussed below). In such embodiments, the webinar chosen to complete the one or more portions of the financial form may depend on both the financial event and the user's mood. The webinars in Webinar Engine (201) may be stored in a database, a flat file, or any other datastore well known in the art.

In or more embodiments of the invention, Navigation Path Builder (212) is used to generate a navigation path for a financial form. A navigation path includes a series of webinar events associated with the one or more financial events that will be reported by the financial form. In other words, a navigation path is used as a framework to complete the financial form. Successfully completing the form requires using the webinars associated with the financial events included in the navigation path.

Consider the following example, which in no way is intended to limit the invention. The birth of a child, earning wages from full time employment, and paying a mortgage are all examples of financial events. An income tax form is an example financial form that reports these example financial events. A navigation path pertaining to the income tax form may include a series of webinar events, where each webinar event is associated with one of the example financial events. One skilled in the art will appreciate that it may be required to use a series of different webinars (in various different combinations, ordering, skill levels, etc.) to complete the income tax form.

In one or more embodiments of the invention, Demographic Engine (210) is used to generate one or more shadow examples. When a user (not shown) is completing a financial form via a navigation path, the user may request a shadow example for assistance. As many sections in a financial form are user specific, the shadow example illustrates worked examples by a theoretical user who is demographically similar to the actual user.

Consider the following example, which in no way is intended to limit the invention. An income tax form is an example financial form. Paying a student loan is an example financial event reported by a section of the income tax form. While attempting to complete the student loan section of an income tax form, the user may request a shadow example. The shadow example may illustrate a completed student loan section of the income tax form by a theoretical user demographically similar to the actual user. In one or more embodiments of the invention, the shadow example may be an exact graphical image of a completed section or form completed by the actual user in the past. In one embodiment of the invention, a shadow example may be presented automatically without a request from the user.

In one or more embodiments of the present invention, Management Engine (108) may provide a user interface, such as a graphical user interface (GUI) (shown and described in relation to FIG. 3 and FIG. 4), to Webinar Engine (101), Navigation Path Builder (112), Demographic Engine (110), and Financial Events Repository (114). Management Engine (108) may be configured to accept input (e.g., keyboard input, cursor input, voice commands, etc.) from the user and produce outputs (e.g., on a display screen, printer, audio speakers, etc.).

Figure 2:
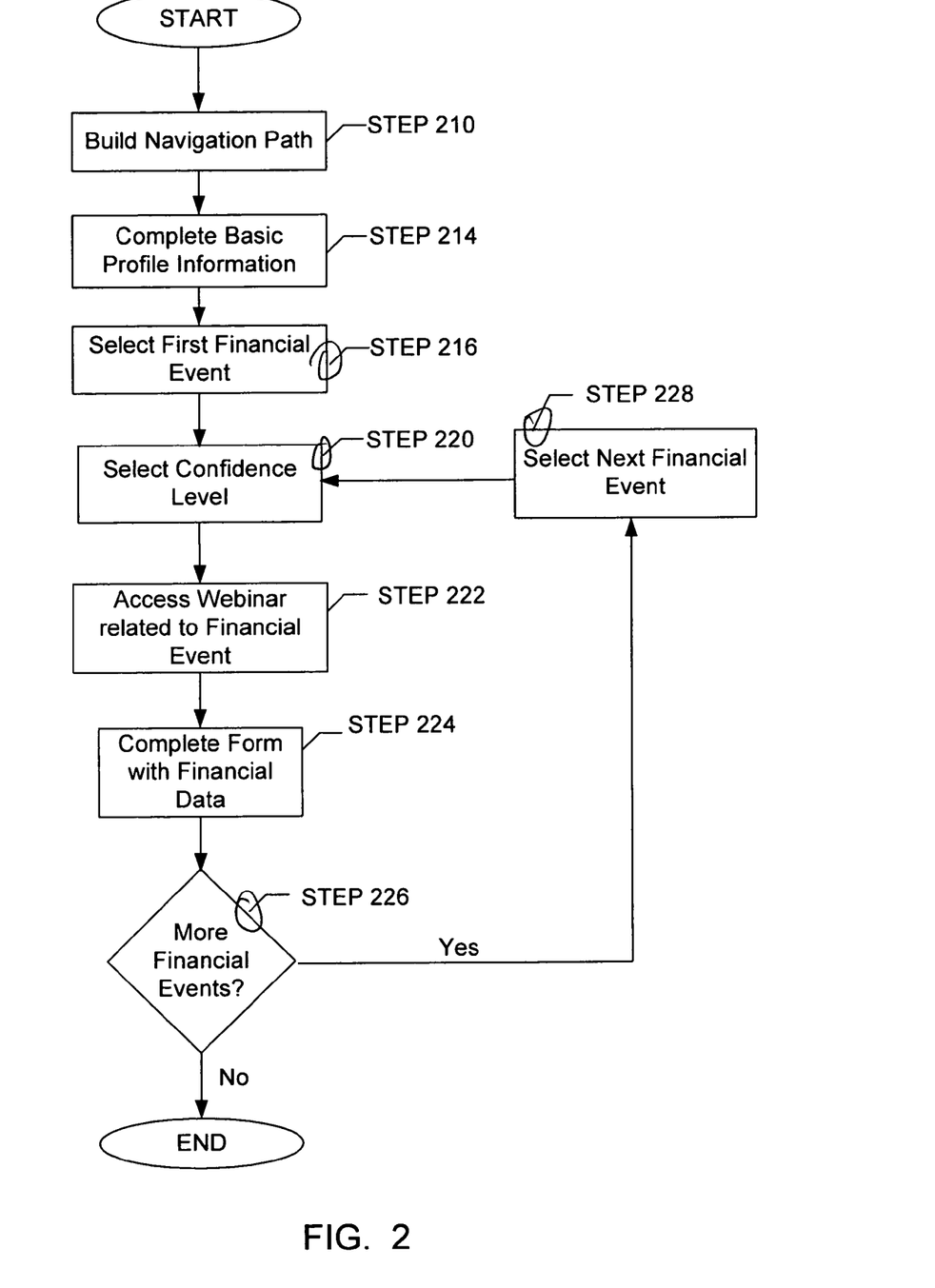
FIG. 2 shows a flowchart in accordance with one or more embodiments of the invention.

FIG. 2 shows a flowchart in accordance with one or more embodiments of the invention. In STEP 210, a navigation path for a financial form is built. In STEP 214, basic user profile information is completed. In STEP 216, the first financial event in the navigation path is selected. In STEP 220, the confidence level associated with the user of the webinar related the selected financial event is set. In STEP 222, the webinar related to the financial event is accessed. In STEP 224, financial data is entered into the financial form using the accessed webinar. In STEP 226, a determination is made whether addition financial events exist in the navigation path. In STEP 228, the next financial path in the navigation path is selected, and the process returns to STEP 220. Each step is discussed in detail below.

Those skilled in the art will appreciate that one or more embodiments of the invention may be implemented with more or less steps than shown in FIG. 2. Those skilled in the art will also appreciated that in one or more embodiments of the invention, the sequence of steps shown in FIG. 2 may be arranged in a different order.

Figure 3:
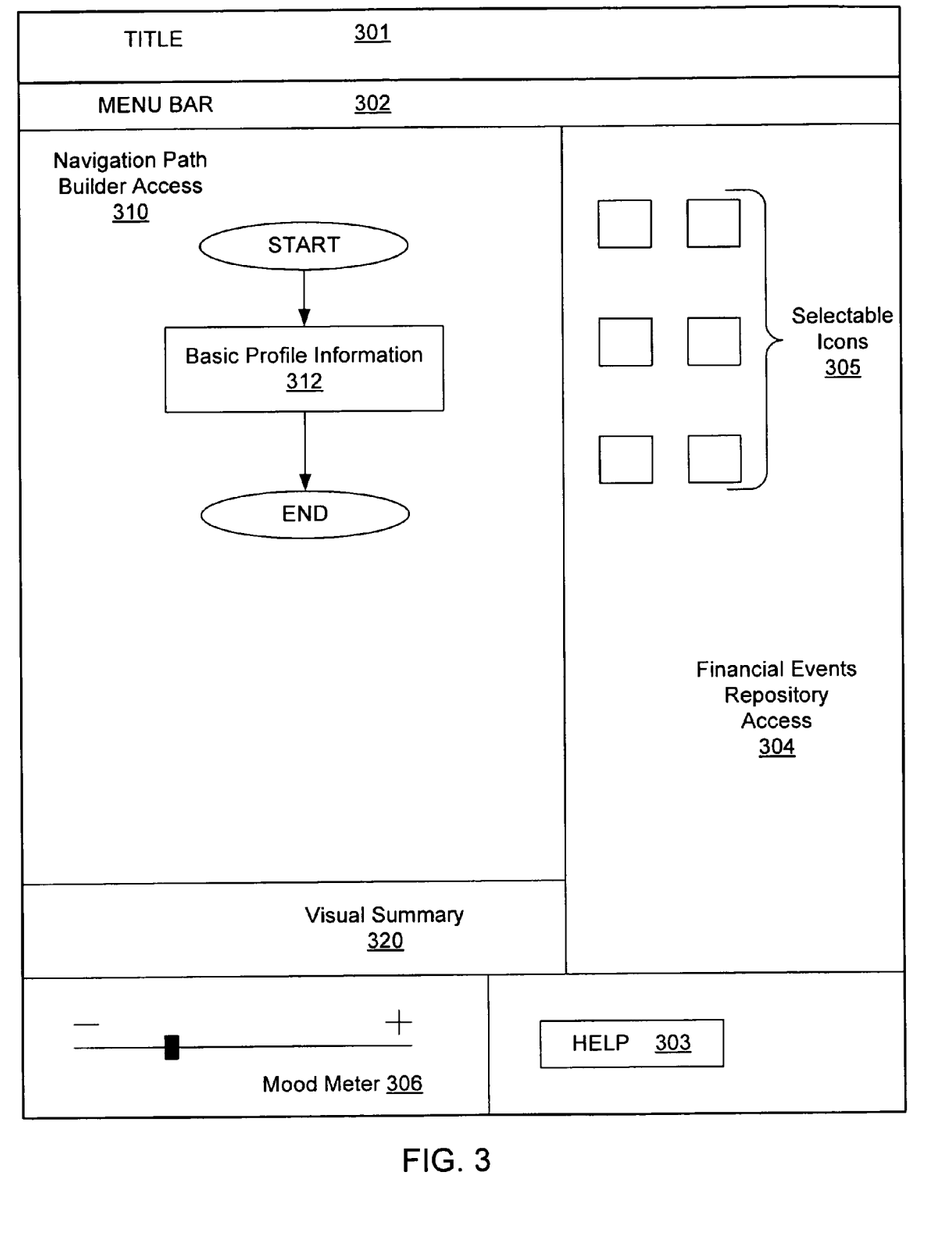
FIG. 3 and FIG. 4 show an interface in accordance with one or more embodiments of the invention.

As discussed above, initially, a navigation path for a financial form is built (STEP 210). FIG. 3 shows an interface for building a navigation path in accordance with one or more embodiments of the invention.

The interface may be generated by the Management Engine (108) in accordance with one or more embodiments of the invention. The interface may include a Title (301), a Menu Bar (302), and a Help Button (HELP (303)), which are all well known to those of ordinary skill in the art. The Menu Bar (302) may allow the user to open and/or close an existing navigation path or financial event repository, save the present navigation path, rename the present navigation path, and/or create a new navigation path for a specific financial form, in addition to the options regularly presented on menu bars well known to those of ordinary skill in the art.

In one or more embodiments of the invention, the interface may include a mood meter (Mood Meter (306)). Mood Meter (306) may be displayed in the form of radio buttons, checkboxes, sliders or any other GUI controls well known in the art to select values. Mood Meter (306) may permit the user to select one or more values reflecting the user's familiarity, confidence, happiness, patience, and/or other feelings towards generating a navigation path for the financial form requiring completion. For example, the selected values may take on ranges from "sad to happy", "contemplative to impatient", and/or "not familiar with this to familiar with this", etc. The one or more selected values may be referred to as mood values. The values selected using Mood Meter (306) may be used to determine the contents of one or more help files retrieved by the Help Button (HELP (303)). Consider the following example, which in no way is intended to limit the invention. A user may use Mood Meter (306) to select a confidence level reflecting the user's confidence in generating a navigation path. Should the user select a low confidence value using Mood Meter (306), the contents of any help file presented to the user may be very detailed with plenty of worked examples. However, should the user select a high confidence value using Mood Meter (306), the contents of any help file presented to the user may be highly technical and may show only advanced and/or special case examples pertaining to the financial form requiring completion. In one or more embodiments of the invention, the help contents may be provided by a third party using plug-ins which are well known in the art. For example, the plug-ins may be linked to a financial expert, the voice of a celebrity, or even a comic strip character.

In one or more embodiments of the invention, the values selected using Mood Meter (306) may change the appearance of the interface in an effort to conform with the user's mood. For example, such changes may include altering the colors of the interface and/or altering the overall layout and/or appearance of elements (e.g., GUI controls, Menu bars, etc.) on the interface. In one or more embodiments of the invention, the cosmetic features of the interface may be provided by a third party using plug-ins which are well known in the art.

In one or more embodiments of the invention, the values selected using Mood Meter (306) may change the behavior of the interface. Consider the following example, which in no way is intended to limit the invention. A user may use Mood Meter (306) to select a confidence level reflecting the user's confidence in generating a navigation path. Should the user select a low confidence value using Mood Meter (306), the interface may force the user to take a guided step-by-step approach to generating the navigation path. In such a situation, the user may even be required to select from a catalogue of pre-existing or pre-defined navigation paths. The user may be given little flexibility in arranging the order of financial events in the navigation path. However, should the user select a high confidence value using Mood Meter (306), the interface may allow the user to freely design navigation paths and set the order of financial events in the navigation path. In such a situation, fewer restraints would be placed on the user. In one or more embodiments of the invention, the behavioral features of the interface may be provided by a third party using plug-ins which are well known in the art.

Still referring to FIG. 3, the interface provides access to the financial events repository (Financial Events Repository Access (304)). In one or more embodiments of the invention, each financial event stored in the Financial Event Repository may appear as a selectable icon (305) in Financial Events Repository Access (304). The interface may also provide access to the navigation path builder (Navigation Path Builder Access (310)). As shown in FIG. 3, in one or more embodiments of the invention, every navigation path may be represented by a flow chart with a start and a stopping point in Navigation Path Builder Access (310). In one or more embodiments of the invention, the navigation path for the financial form may be built by dragging icons from the Financial Events Repository Access (304) onto Navigation Path Builder Access (310).

Figure 4:
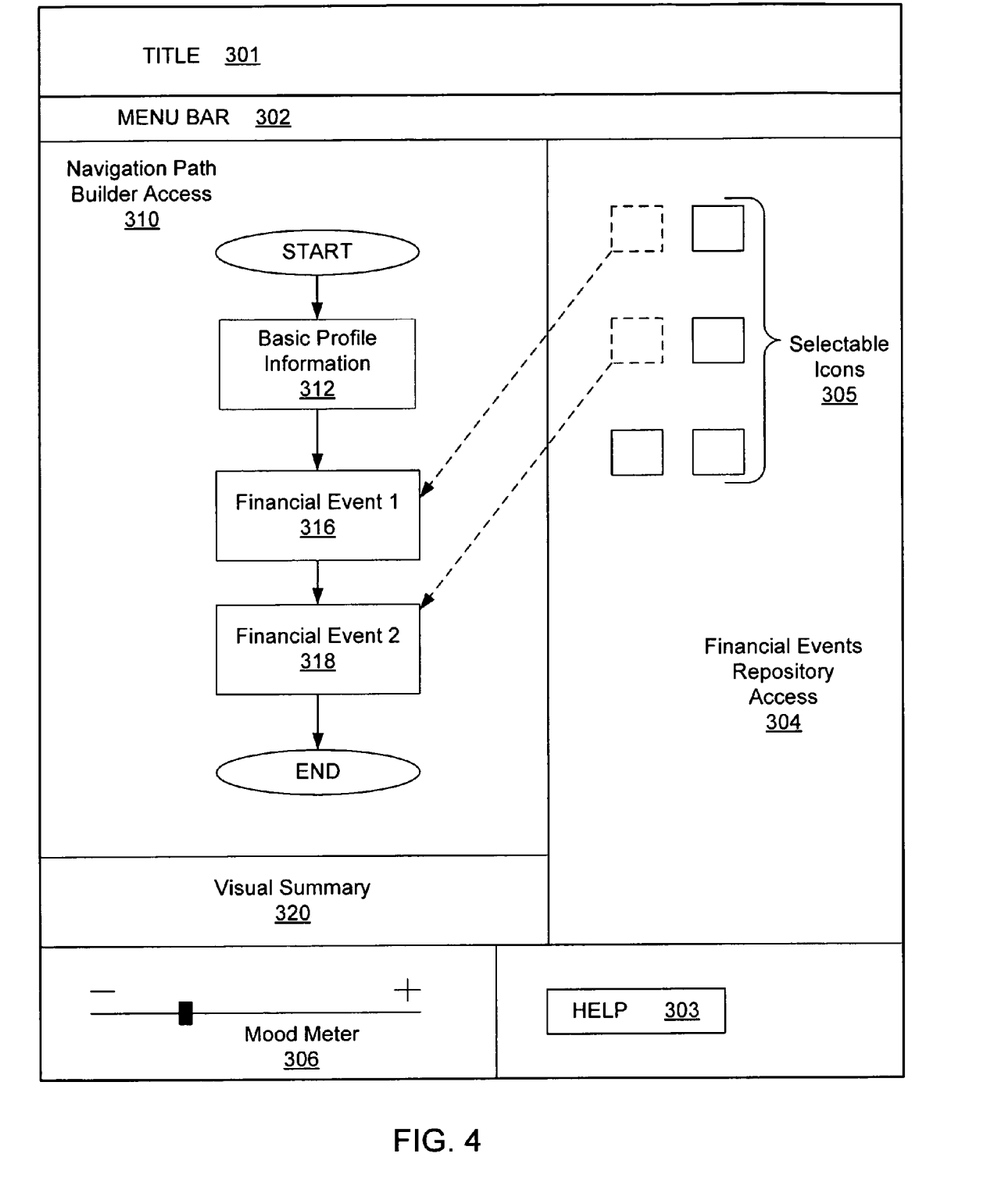

FIG. 4 shows an interface for building a navigation path in accordance with one or more embodiments of the invention. FIG. 4 is essentially the same as FIG. 3, except FIG. 4 shows two financial event icons (Financial Event 1 (316), Financial Event 2 (318)) that have been dragged from Financial Events Repository Access (304) onto Navigation Path Builder Access (310). Financial Event 1 (316) and Financial Event 2 (318) are financial events included in the navigation path. Accordingly, Financial Event 1 (316) and Financial Event 2 (318) will be reported by the financial form for which the navigation path is being built. In one or more embodiments of the invention, the order of the financial events in the navigation path is set by the user. In one or more embodiments of the invention, the order of the financial events is selected automatically as defined by a financial professional.

Returning to FIG. 3, in one or more embodiments of the invention, the interface may provide a visual summary (320) of the financial form requiring completion. Visual Summary (320) may be cartoon strip or other visual display that provides a graphical summary of selected key financial events reported by the financial form and allows one financial form to be compared with other financial forms or the same financial form of previous years. In one or more embodiments of the invention, the interface may also provide a means, such as buttons (not shown), for directly viewing, directly editing, electronically submitting to a financial body, and/or printing the completed financial forms.

Referring back to FIG. 2, in STEP 214, the user is required to complete basic profile information. Basic profile information may include, for example, the user's name, social security number, date of birth, marital status, home or office address, telephone number or any other information that may be required by the financial form. As shown in FIG. 3 and FIG. 4, the requirement to complete basic profile information may be standard in every navigation path (Basic Profile Information (312)). In one or more embodiments of the invention, the user may provide basic profile information by completing a form or questionnaire using a keyboard, mouse, card reader, scanner, biometric device, microphone, and/or other input devices well known in the art.

Continuing with FIG. 2, in STEP 216, the user selects the first financial event in the navigation path. In one or more embodiments of the invention, the first financial event in the navigation path may be automatically selected for the user following the completion of the basic profile information (Basic Profile Information (312)). As discussed above, the user may select one or more values using Mood Meter (306 shown in FIG. 3 and FIG. 4) to reflect the user's familiarity, confidence, happiness, patience, and/or other feelings towards generating a navigation path for the financial form requiring completion. In one or more embodiments of the invention, after selecting a financial event (STEP 216, STEP 228), the user may select one or more values on Mood Meter (306 shown in FIG. 3 and FIG. 4) to reflect the user's familiarity, confidence, happiness, patience, and/or other feelings towards completing the specific sections of the financial form that pertain to the selected financial event.

Consider the following example, which in no way is intended to limit the invention. As discussed above, a mortgage payment is an example financial event. An income tax form is an example financial form used to report mortgage interest payments as an itemized deduction. Accordingly, a mortgage payment event may be included in the navigation path for the income tax form that requires completion. After selecting the mortgage payment event in the navigation path, the user may select on a value on Mood Meter (306) reflecting the user's confidence regarding mortgage payments and completing the sections of the financial form relating to mortgage interest payment as an itemized deduction.

In STEP 222, the user may access the webinar associated with the selected financial event. As discussed above, a webinar is associated with a financial event and is used to complete one or more sections of a financial form that pertains to the financial event. In one or more embodiments of the invention, a webinar may also be associated with a confidence level, such as the confidence level selected in STEP 220. In other words, the webinar accessed by the user may depend on both the selected financial event in the navigation path and the user's confidence in completing the sections of the financial form that pertain to the selected financial event. There may be numerous webinars for a single financial event, where each webinar is associated with a specific confidence level or range of confidence levels.

Figure 5:
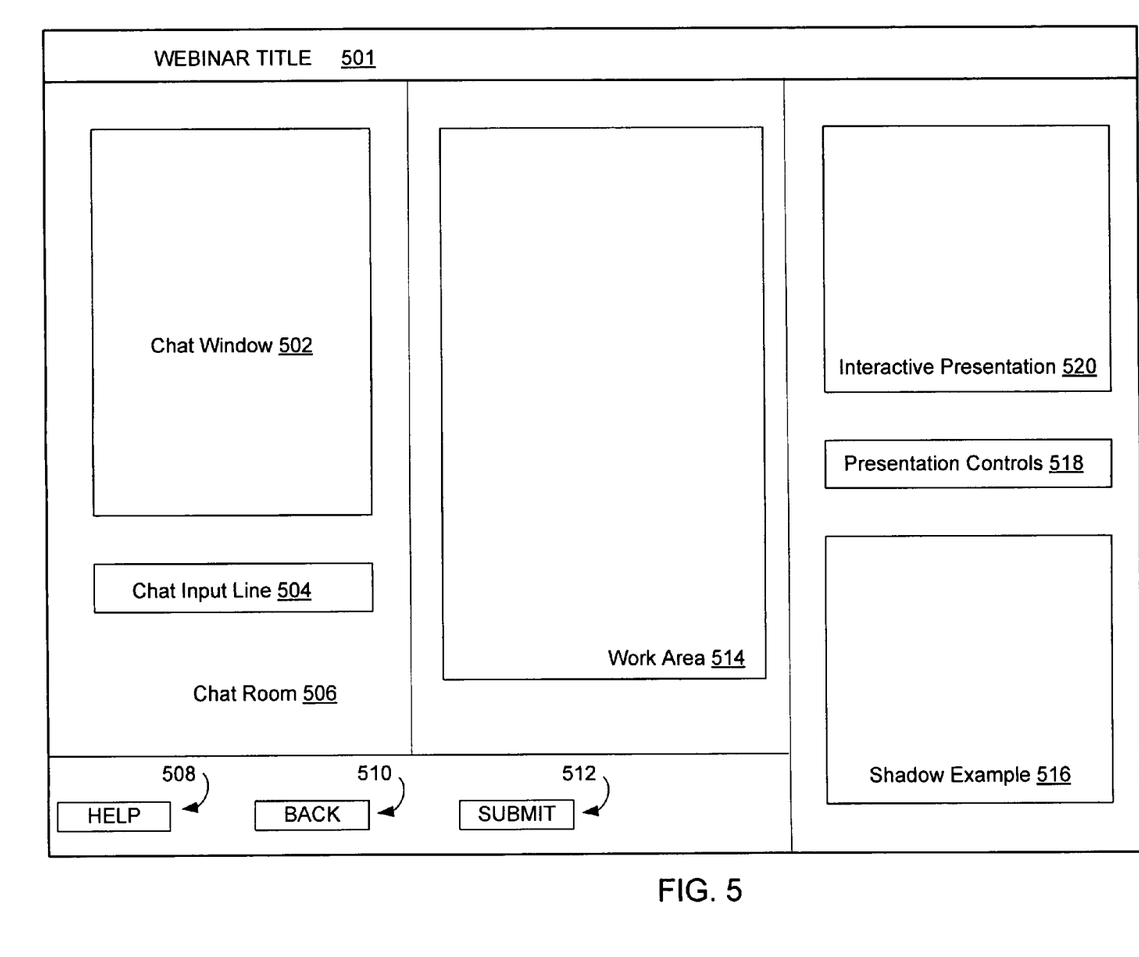
FIG. 5 shows a graphical display of a webinar in accordance with one or more embodiments of the present invention.

FIG. 5 shows a graphical display of a webinar in accordance with one or more embodiments of the present invention. As shown in FIG. 5, a webinar may include a title (Webinar Title (501)), a Help Button (HELP (508)), a Back button (BACK (510)), a Submit button (SUBMIT (512)). A webinar may also include a chat room (Chat Room (506)) with a chat window (Chat Window (502)) and an input line (Chat Input Line (504)) which are all well known in the art. The webinar may further include an interactive presentation (Interactive Presentation (520)), presentation controls (Presentation Controls (518)), and a shadow example (Shadow Example (516)). The webinar may still further include a work area (Work Area (514)). Each of these components of the interface are described below.

In one or more embodiments of the invention, Work Area (514) may provide an area for a user to input financial data, perform financial calculations, and request help. Work Area (514) may present forms or questionnaires for the user to complete in order to acquire financial data. The financial data acquired in Work Area (514) may be used to complete the one or more sections of the financial form associated with the financial event to which the webinar pertains. In one or more embodiments of the invention, Work Area (514) may provide a calculator for use. In one embodiment of the invention, Work Area (514) may be a GUI interface with textboxes, radio buttons, and other GUI controls well known in the art.

In one or more embodiments of the invention, Interactive Presentation (520) may be an animation, a video presentation, an audio presentation, or any type of presentation well known in the art. The content of Interactive Presentation (520) may provide the user with interactive instructions on what type of financial data to enter into Work Area (514) and the required format of such financial data in order to complete the sections of the financial form associated with the financial event to which the webinar pertains. Interactive Presentation (520) may also provide the user with instructions as to where specific financial data may be located (and a graphical representation of the exact appearance of the form on which the data may be found, if applicable) so it may be entered into Work Area (514). Interactive Presentation (520) may be controlled by Presentation Controls (510) that include features such as pause, replay, forward, stop, and other control functions well known in the art.

In one or more embodiments of the invention, Chat Room (506) provides a means for the user to communicate with others for assistance while entering financial data into Work Area (514). In one or more embodiments of the invention, the user may chat with a virtual person. In one or more embodiments of the invention, the user may chat with a real person connected via a network, such as the Internet.

In one or more embodiments of the invention, Shadow Example (516) illustrates the financial data entered into the Work Area (516) and/or detailed examples by a theoretical user who is demographically similar to the actual user. As discussed above, the Shadow Example (516) may be generated by Demographic Engine (210) using the basic profile information (FIG. 2, STEP 214) provided by the user. In one or more embodiments of the invention, the shadow example may be a completed section or form completed by the actual user in the past. Shadow Example (516) may be requested by the user through Work Area (514) or may be presented to the user automatically.

In one or more embodiments of the invention, HELP (508) is essentially the same as HELP (303), but provides help for using the webinar. In one or more embodiments of the invention, SUBMIT (512) may allow the user to submit the financial data entered into Work Area (514) to complete the financial form and then return to the navigation path. In one or more embodiments of the invention, BACK (510) allows the user to return to the navigation path without submitting the data entered into Work Area (514). In one or more embodiments of the invention, a button (not shown) allows the user to view and/or edit the actual financial form being completed.

Referring back to FIG. 2, once the webinar has been accessed (STEP 222), the financial event in the navigation path may be displayed with some identification mark (e.g., a check of a checkbox, strike-through text, flag, etc.) indicating the webinar has already been accessed. In one or more embodiments of the invention, the user may revisit a webinar that has been previously accessed. In one or more embodiments of the invention, when one or more sections of the financial form associated with the financial event are complete with data (STEP 224), it is determined whether more financial events exist in the navigation path (STEP 226). If more financial events exist, the next financial event is selected (STEP 228) and the process returns to STEP 222.

In one or more embodiments of the invention, a financial form may be completed using only a webinar (i.e., a webinar outside the context of a navigation path). In other words, upon selecting a financial form requiring completion (e.g., via Menu Bar (302)), the user may be directed to a webinar with an interactive presentation (e.g, Interactive Presentation (520)) addressing all financial events reported by the financial form. Such an interactive presentation may provide the user with interactive instructions on what type of financial data to enter into the webinar's work area (e.g., Work Area (514)) and the required format of such financial data in order to complete all sections of financial form. The webinar to which the user is directed may also be based on one or more mood values (discussed above) selected by the user.

Figure 6:
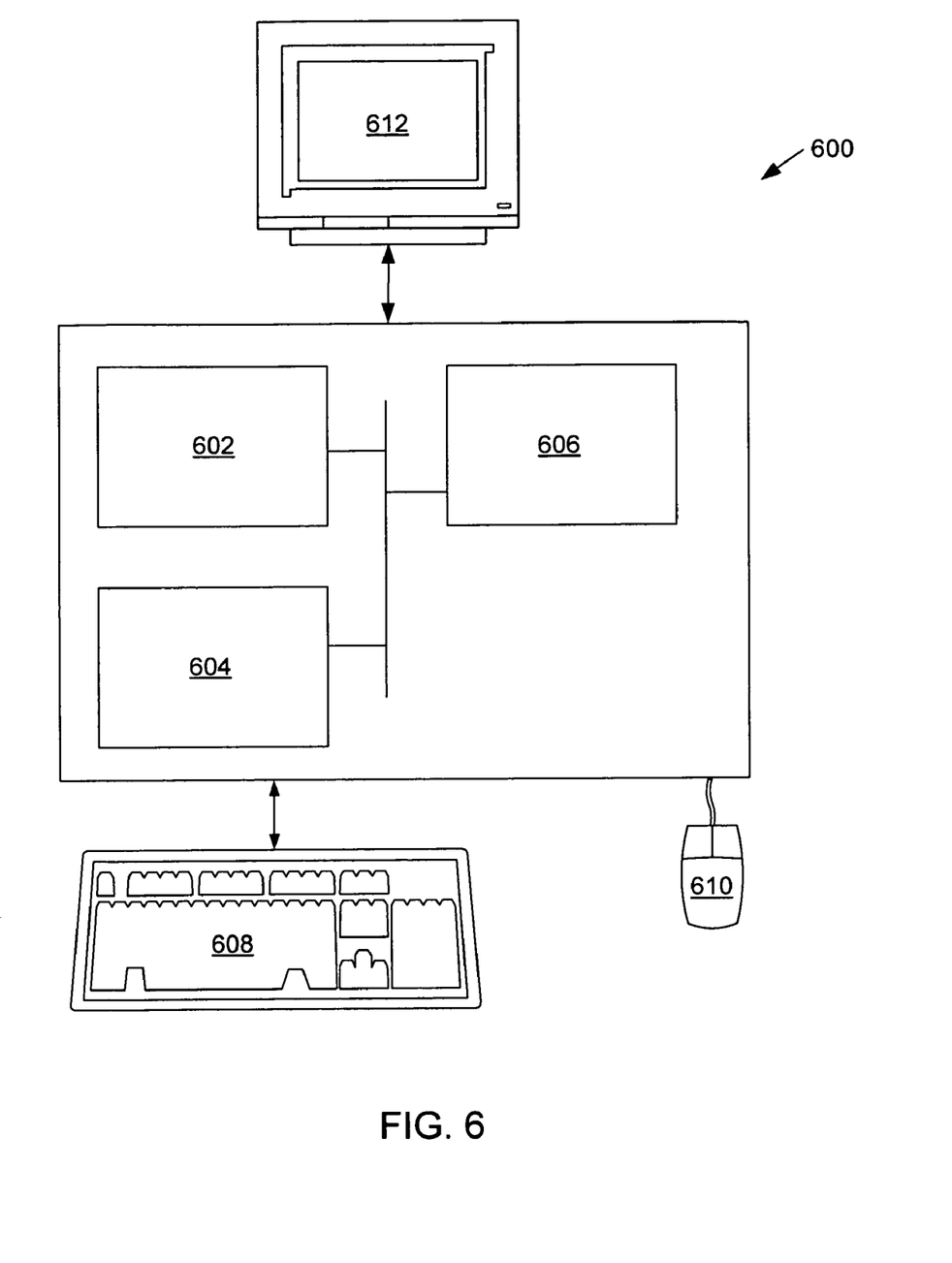
FIG. 6 shows a computer system in accordance with one embodiment of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., navigation builder, management engine, demographic engine, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for completing a financial form comprising:
   generating a navigation path by selecting a plurality of financial events, wherein the navigation path is used as a framework to complete the financial form;
   selecting a webinar event from the plurality of financial events in the navigation path, wherein the webinar event is one of the plurality of financial events associated with at least one webinar related to one of the plurality of financial events; and
   completing at least a portion of the financial form using the at least one webinar.

2. The method of claim 1, wherein the webinar comprises at least one selected from the group consisting of an interactive presentation and a work area.

3. The method of claim 1, wherein the financial form is a tax form.

4. The method of claim 1, further comprising:
   selecting a mood value; and
   obtaining a help file associated with the navigation path based on the mode value.

5. The method of claim 4, wherein the help file is a plug-in to the at least one webinar.

6. The method of claim 1, further comprising:
   selecting a mood value based on the financial event, wherein the webinar is further associated with the mood value.

7. The method of claim 1, further comprising:
   generating a first visual summary of the financial form after completing the at least one portion of the financial form.

8. The method of claim 7, further comprising:
   comparing the first visual summary with a second visual summary.

9. The method of claim 1, wherein at least one of the plurality of financial events is obtained from a user.

10. The method of claim 1, wherein completing the at least one portion of the financial form using the at least one webinar comprises:
    requesting a shadow example.

11. The method of claim 1, wherein completing the at least one portion of the financial form using the at least one webinar comprises:
    accessing a chat room.

12. A system for completing a financial form using a plurality of financial events, comprising:
    a webinar engine comprising at least one webinar, wherein the at least one webinar explains at least one of the plurality of financial events;
    a navigation path engine for generating a navigation path comprising a webinar event from the plurality of financial events, wherein the navigation path is used as a framework to complete the financial form; and
    a management engine configured to complete at least a portion of the financial form by providing an interface to use a webinar from the plurality of webinars, wherein the webinar is associated with the webinar event in the navigation path.

13. The system of claim 12, wherein the interface provides the user access to the navigation path engine to generate the navigation path.

14. The system of claim 12, wherein the interface further comprises a mood meter to associate the financial event with a mood value.

15. The system of claim 12, wherein interface is a graphical user interface.

16. The system of claim 12, wherein the plurality of financial events are contained within a repository.

17. The system of claim 12, further comprising:
    a demographic engine operatively connected to the management engine and configured to generate a shadow example for the webinar.

18. The system of claim 12, wherein the webinar comprises at least one selected from the group consisting of an interactive presentation and a work area.

19. The system of claim 12, wherein the webinar comprises a chat room.

20. The system of claim 12, wherein the management engine is further configured to generate a visual summary after completing the at least one portion of the financial form.

21. A method for completing a financial form comprising:
    selecting the financial form requiring completion, wherein the financial form reports a financial event;
    completing the financial form using a webinar event based on the financial event.

22. The method of claim 21, wherein the webinar comprises at least one selected from the group consisting of an interactive presentation and a work area.

23. The method of claim 21, wherein the financial form is a tax form.

24. The method of claim 21, wherein the webinar event is further based on a mood value.

25. A computer readable medium containing instructions for completing a financial form, the instructions comprising functionality to:
    generate a navigation path by selecting a plurality of financial events, wherein the navigation path is used as a framework to complete the financial form;
    select a webinar event from the plurality of financial events in the navigation path, wherein the webinar event is one of the plurality of financial events associated with at least one webinar related to the one of the plurality of financial events; and
    complete at least a portion of the financial form using the at least one webinar.

26. The computer readable medium of claim 25, wherein the instructions to complete the at least one portion of the financial form using the at least one webinar further comprise functionality to:
    access an interactive presentation.

27. The computer readable medium of claim 25, wherein the instructions to complete the at least one portion of the financial form using the at least one webinar further comprise functionality to:
    request a shadow example.

28. The computer readable medium of claim 25, wherein the instructions to complete the at least one portion of the financial form using the at least one webinar further comprise functionality to:
    access a chat room.

29. A computer readable medium containing instructions for completing a financial form, the instructions comprising functionality to:
    selecting the financial form requiring completion, wherein the financial form reports a financial event;
    completing the financial form using a webinar event based on the financial event.

30. The computer readable medium of claim 29, wherein the instructions to complete the financial form using the webinar event further comprise functionality to:
    access an interactive presentation.

* * * * *